United States Patent
Lyons et al.

(10) Patent No.: US 8,080,341 B2
(45) Date of Patent: Dec. 20, 2011

(54) ELECTROCHEMICAL CELLS FOR ENERGY HARVESTING

(75) Inventors: Karen Swider Lyons, Alexandria, VA (US); Ryan C Wartena, Los Angeles, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 12/479,899

(22) Filed: Jun. 8, 2009

(65) Prior Publication Data

US 2010/0159363 A1    Jun. 24, 2010

Related U.S. Application Data

(62) Division of application No. 10/673,342, filed on Sep. 30, 2003, now abandoned.

(51) Int. Cl.
*H01M 8/02* (2006.01)
(52) U.S. Cl. ........................ 429/400; 429/523
(58) Field of Classification Search .................. None
See application file for complete search history.

(56) References Cited

U.S. PATENT DOCUMENTS

| | | | |
|---|---|---|---|
| 5,737,181 A * | 4/1998 | Evans | 361/504 |
| RE37,433 E * | 11/2001 | Zimmerman et al. | 205/620 |
| 6,383,363 B2 * | 5/2002 | Jow et al. | 205/704 |
| 6,869,714 B2 * | 3/2005 | Nishiki et al. | 429/494 |

OTHER PUBLICATIONS

Wartena, Ryan et al., "Asymmetric Hydrous . . . Capabilities", NRL Surface Chemistry Branch, 2002 (no month), vol. 26, 444-445.*
$202^{nd}$ Meeting of the Electrochemical Society, "Surface Potential . . . Ruthenium Oxide", Salt Lake City, UT, Oct. 20-25, 2002.*

* cited by examiner

*Primary Examiner* — John S Maples
(74) *Attorney, Agent, or Firm* — Amy L Ressing; Joseph T Grunkemeyer (57) ABSTRACT

A device having a positive electrode, a negative electrode, and an ion-conducting electrolyte in contact with both electrodes. Each electrode has a metal, a metal oxide, a hydrous metal oxide, alloy thereof, or mixture thereof, however, the electrodes are different such materials. The positive electrode is capable of storing and donating ions and electrons and reducing oxygen. The negative electrode is capable of storing and donating ions and electrons and oxidizing hydrogen. The electrolyte permits transport of oxygen and hydrogen. The device can charge using ambient hydrogen and oxygen. It can be discharged as an electrochemical capacitor or be operated in a fuel cell mode.

20 Claims, 12 Drawing Sheets

ELECTROCHEMICAL CELLS FOR ENERGY HARVESTING

This application is a divisional application of U.S. patent application Ser. No. 10/673,342, filed on Sep. 30, 2003, now abandoned.

BACKGROUND OF THE INVENTION

1. Field of the Invention

The invention relates generally to electrochemical capacitor cells, fuel cells, and energy harvesting.

2. Description of the Prior Art

The power source of choice for autonomous electronic devices is batteries, but they must be either continuously replaced or recharged when they run out of energy. Similarly, fuel cells and other fuel conversion systems require fuel replenishment. For some autonomous devices, a maintenance free situation is highly desirable, so that the device can operate unattended for days, months, or years. The power source for the device often must have the ability to operate at different power levels, for instance at low power while collecting data, and at high power during data transmission.

Energy harvesting devices provide a means to recharge batteries or supply energy directly to a device in a maintenance-free situation. For instance, solar cells can be used to charge batteries during the day so that the energy can be used at night. Another energy harvesting device includes elastomeric polymers that can be used on heel strikes to harvest the energy that a person generates while walking. A disadvantage of energy harvesting methods is that they can usually only be used in specific conditions (e.g. sunlight or under compression). They also generally have low power (on the order of microwatts per square centimeter) and can be used to operate only low-power devices.

Another energy harvesting option is to power a device by scavenging the hydrogen available in the atmosphere. Hydrogen is the best fuel for fuel cells in which hydrogen and oxygen gas react at different electrodes to create electricity and water. Although the hydrogen is available in the ambient at ppm levels, it is always available. In a fuel cell, hydrogen oxidation occurs at the anode or negative electrode of the cell and oxygen reduction occurs at the cathode or positive electrode. In a device that utilizes the hydrogen from the environment, the anode or negative electrode should be catalytically active for hydrogen oxidation and the cathode should be catalytically active for oxygen reduction.

Hydrous ruthenium dioxide (which is designated in the literature as $RuO_xH_y$, $RuO_2 \cdot xH_2O$, and hydrous $RuO_2$) is a charge-storage material in ultracapacitors. It has a maximum specific capacitance of 700 to 800 F/g when it has been heated at 150° C. and has a composition of approximately $RuO_x \cdot 0.5H_2O$. This maximum in capacitance has been ascribed to the point at which the competing protonic and metallic transport mechanisms in the hydrous $RuO_2$ are both optimized. The mixed protonic and metallic conductivity of hydrous $RuO_2$ plus its electrocatalytic nature also makes it useful as an electrocatalyst for brine oxidation in dimensionally stable anodes, methanol oxidation at Pt—Ru anodes, and water oxidation with $Ce^{4+}$. Ruthenium oxides are also active for oxygen reduction.

Aqueous $RuO_2$ ultracapacitors typically comprise symmetric hydrous $RuO_2$ positive and negative electrodes and a 5 M sulfuric acid ($H_2SO_4$) electrolyte. The uncharged symmetric electrodes have an open circuit voltage (OCV) of 0 V, but the electrodes can hold potential differences up to 1.4 V after charging. The accepted mechanism for charge storage in hydrous $RuO_2$ is via the "double-insertion" of electrons and protons into the structure. As the positive electrode is discharged, the average oxidation state of the Ru is reduced from $4^+$, to $3^+$ and then $2^+$. The opposite trend occurs at the negative electrode. Because hydrous $RuO_2$ is predominantly metallic, most of the electronic states are delocalized, and the oxidation states are averaged. The discharge and charge reactions are given in formulas 1 and 2, respectively.

Discharge Mechanism of Positive Electrode:

$$RuO_x(OH)_y + \delta H^+ + \delta e^- \rightarrow RuO_{x-\delta}(OH)_{y+\delta} \quad E_{max} = 1.4V \text{ vs.} NHE \qquad (1)$$

Charge Mechanism of Negative Electrode:

$$RuO_{x-\delta}(OH)_{y+\delta} \rightarrow RuO_x(OH)_y + \delta H^+ + \delta e^- \quad E_{min} = \sim 0V \qquad (2)$$

A major drawback of $RuO_2$ ultracapacitors is their tendency of the electrodes to undergo self-discharge and potential recovery resulting in a decrease in cell voltage (and loss of power) over time. Self-discharge refers to the decrease in voltage that occurs after the positive electrode has been charged. Potential recovery describes a minor reaction at the negative electrode—after charging, the voltage of the negative electrode drifts positive.

SUMMARY OF THE INVENTION

The present invention provides a device comprising a positive electrode, a negative electrode, and an electrolyte in contact with both electrodes. Each electrode comprises a material comprising a metal, a metal oxide, a hydrous metal oxide, alloy thereof, or mixture thereof; however, the electrodes are different compositions of such materials. The positive electrode is capable of storing and donating ions and electrons and reducing oxygen. The negative electrode is capable of storing and donating ions and electrons and oxidizing hydrogen. The electrolyte permits transport of oxygen and hydrogen.

The invention further provides a method of harvesting energy comprising the steps of providing the above device, allowing the device to charge, and discharging the device.

The invention further provides a device comprising a positive electrode comprising hydrous ruthenium oxide coated on platinum metal, a negative electrode comprising platinum metal, and an electrolyte in contact with the positive electrode and the negative electrode. The electrolyte comprises dissolved oxygen and hydrogen and is exposed to ambient air.

BRIEF DESCRIPTION OF THE DRAWINGS

A more complete appreciation of the invention will be readily obtained by reference to the following Description of the Example Embodiments and the accompanying drawings.

DETAILED DESCRIPTION OF THE PREFERRED EMBODIMENTS

In one embodiment, an electrochemical power source is provided that can supply nW to µW/cm² levels of power and/or continuous energy by harvesting energy from the environment. Specifically, the energy-harvesting device can convert hydrogen and oxygen harvested from the atmosphere into electricity via a fuel cell mechanism. Because of the electrode design, the device is also capable of storing charge and delivering the stored energy in a pulse, and serve as an electrochemical capacitor (or ultracapacitor). The device has been demonstrated in several environments, including laboratory grade dilute acid, seawater, tap water, and humid air.

Figure 1:
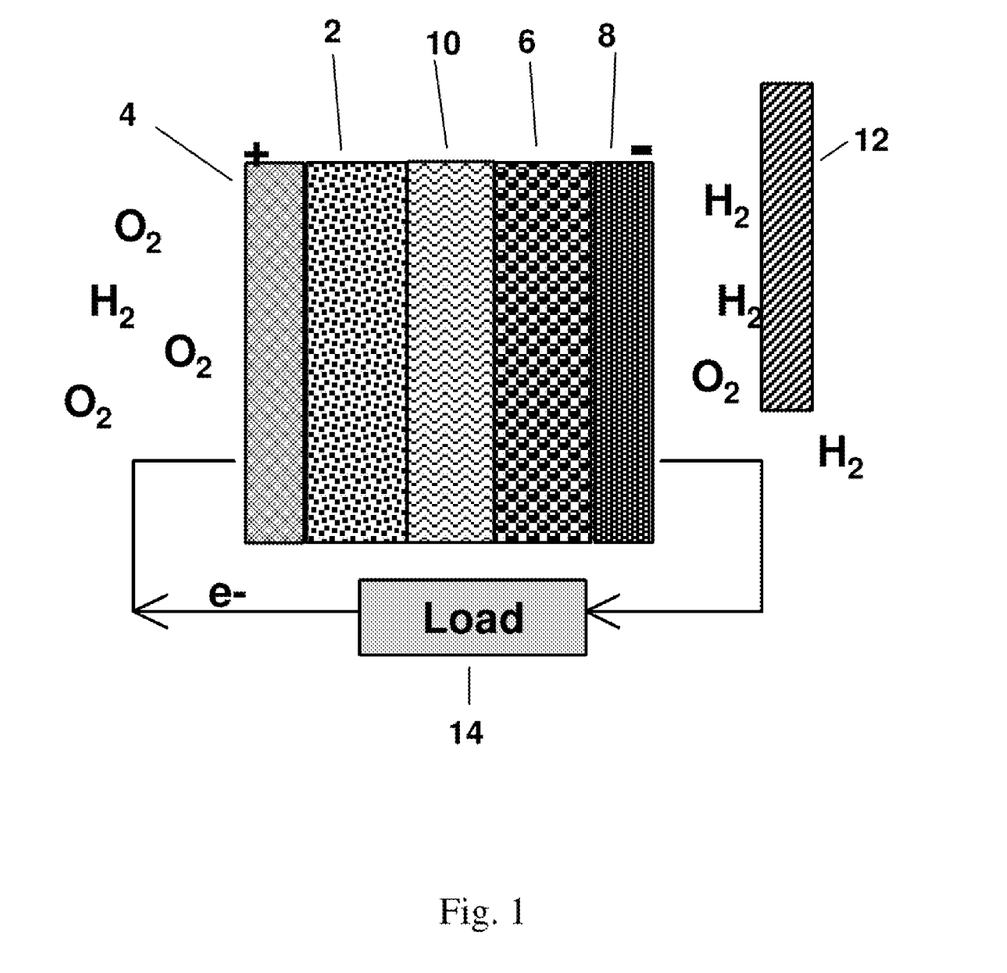
FIG. 1 schematically illustrates an embodiment of the invention.

A schematic of the device is shown in FIG. 1. The device includes positive electrode 2, positive electrode current collector 4, negative electrode 6, negative electrode current collector 8, and separator 10. The electrolyte can be dilute acid or base, tap water, or seawater, and is permeated throughout the positive electrode 2, negative electrode 6, and separator/electrolyte 10. The device also optionally includes an additional metal 12 that can enhance water splitting into oxygen and hydrogen. The electrochemical device can be discharged through a load, 14. In some embodiments, an electrode and corresponding current collector may be the same component/material, such as when a clean Pt foil is used as an electrode.

Proposed reaction mechanisms are not intended to limit the scope of the claimed invention. When the positive electrode and the negative electrode are both placed in contact with the electrolyte, potential recovery and self-discharge occur on each electrode due to oxygen reduction and hydrogen oxidation reactions, respectively, leading to a net recharging of the cell. Examples for potential recovery and self-discharge reactions in acidic conditions are given in Formulas 3 and 4 respectively. While the oxygen is being reduced, the metal in the positive electrode is oxidized, leading to a net zero charge of the electrode and fulfilling the compulsory conditions of charge balance. Hydrogen oxidation is accompanied by reduction of the metal in the negative electrode. The use of noble metals and other insoluble oxides ensures that no metal dissolution occurs and the electrode remains intact. The sum of the reactions in formulas 3 and 4 leads to the observed self-recharging of the electrochemical cell.

Potential recovery:

Oxygen reduction: $O_2 + 4H^+ + 4e^- \rightarrow 2H_2O$

Positive electrode oxidation: $M^1O_{x-4}(OH)_{y+4} \rightarrow M^1O_x(OH)_y + 4H^+ + 4e^-$ Net Potential recovery reaction: $M^1O_{x-4}(OH)_{y+4} + O_2 \rightarrow M^1O_x(OH)_y + 2H_2O$ (3)

Self discharge:

Hydrogen oxidation: $H_2 \rightarrow 2H^+ + 2e^-$

Negative electrode reduction: $2 M^2O_\delta H_{(\delta-1)} + 2H^+ + 2e^- \rightarrow 2M^2O_\delta H_\delta$ Net Self-discharge reaction: $2 M^2O_\delta H_{(\delta-1)} + H_2 \rightarrow 2M^2O_\delta H_\delta$ (4)

The potential recovery reaction is based on the ability of the positive electrode material to reduce oxygen to water while donating protons and electrons. Alternatively, the reaction may take in basic conditions, and the electrode can accept hydroxyl groups and donate electrons. The self-discharge reaction at the negative electrode is based on the ability of the negative electrode to oxidize hydrogen when storing protons and electrons. Alternatively, the negative electrode can store electrons and donate hydroxyl ions. Ions other than protons and hydroxyl ions may also be possible. Both the positive and negative electrodes may comprise a combination of materials, one of which catalytically reduces oxygen or oxidizes hydrogen, the other which accepts or donates ions and electrons. The hydrous oxide, particularly on the negative electrode, may only exist as a scale at the surface of the material.

Examples of materials for the positive electrode 2 include, but are not limited to, hydrous $RuO_2$ ($RuO_2.0.5H_2O$) and hydrous $IrO_2$.

Examples of materials for the negative electrode 6 include, but are not limited to, $Nb_2O_5$, $TiO_2$, $WO_3.xH_2O$, Pt black, Pt foil, $Ag_2O$, anhydrous $RuO_2$, Pd, and a composite of silicic acid with 1-10% $RuO_2$ (hydrous or anhydrous).

Examples of materials for the positive electrode current collector 4 and the negative electrode current collector 8 include, but are not limited to, titanium foil, platinum foil, carbon foil, palladium foil, and carbon paper.

Examples of materials for the separator 10 include, but are not limited to, silicic acid, Nafion (perfluorosulfonic membrane), porous polymer sheets (e.g., Celgard), and a physical gap between electrodes.

The electrolyte, which permeates the separator, has the ability to conduct ions, particularly protons or hydroxyl ions. Suitable electrolytes include, but are not limited to, aqueous electrolytes, acid, sulfuric acid, seawater, tap water, non-aqueous electrolytes, oxides, and polymers.

The positive electrode 2 can have an open circuit potential that is higher than the negative electrode 6. The power of the system is related to the potential difference between the positive electrode 2 and the negative electrode 6. The energy of the system is proportional to the charge-storage capacity of the positive electrode 2 and the negative electrode 6; therefore, the use of high capacity materials, such as hydrous $RuO_2$ is suitable for the electrodes. The current collectors 4, 8 are selected for their electrochemical compatibility with the electrode materials. The performance of the cell may improve if the current collectors are able to convert a fraction of water into hydrogen and oxygen, via the energy from thermal energy or light. Additionally, other metals 12 can be added near the cell to enhance water splitting.

The electrode materials can be a metal, a metal oxide, a hydrous metal oxide, an alloy thereof, or a mixture thereof. To store charge, the hydrous metal oxides must be electronic and ionic conductors. Even if a metal foil or metal particles are used at the negative electrode, the metal will have a thin hydrous metal oxide coating, particularly when placed in contact with an aqueous electrolyte. Metals can also be effective at splitting water into $H_2$ and $O_2$.

Figure 2:
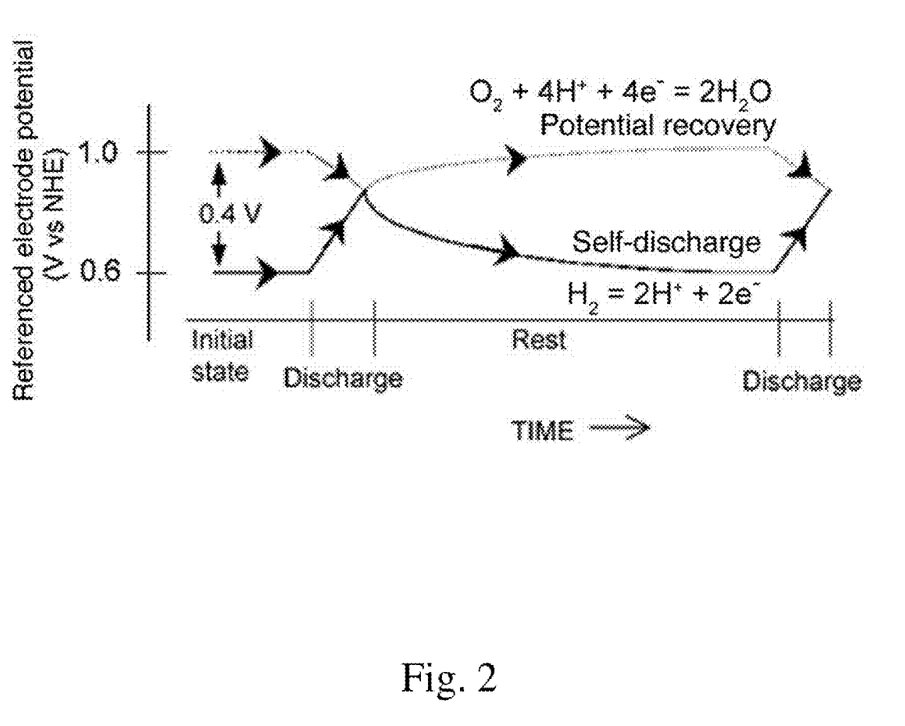
FIG. 2 schematic illustrates the behavior of the positive and negative electrodes as they are discharged and then recover/self-discharge back to their original open circuit voltage.

A device with catalytically active asymmetric electrodes can use the chemistry inherent to self-discharge and potential recovery phenomena to cause cells to "self-charge" or experience a net increase in voltage instead of a loss of voltage. Although the phenomena of self-discharge and potential recovery have previously been associated with detrimental performance of electrochemical power sources, these reactions can be applied to recharge asymmetric electrochemical cells. $O_2$, $H_2$, and $H_2O$ are key reactants. FIG. 2 schematic illustrates the behavior of the positive and negative electrodes as they are discharged and then recover/self-discharge back to their original open circuit voltage. In capacitor mode, the discharge time can be 1 to 120 s and the rest time can be 1 to 3 hr. In fuel cell mode, the cell can be operated at low currents so that the cell voltage does not drop, but instead electricity is pulled from the devices at the rate of the potential recovery and self-discharge mechanisms.

The gases consumed in the potential recovery and self-discharge mechanisms may be replenished by dissolving more gas from ambient air or other air exposed to the electrolyte. The reactions may continue indefinitely, as long as oxygen and hydrogen are available and the electrodes maintain their catalytic activity. The purposeful addition of gas into the electrolyte can affect the process and increase or decrease the reaction.

The discharging and fuel cell reactions may occur simultaneously. The rate of each reaction may depend on the amount of current being drawn by the circuit and the amount of oxygen and hydrogen available. The device can be operated in a steady-state fuel cell mode where a constant current can be delivered as long as dissolved hydrogen and oxygen are available. The steady-state current may be limited by the rates of diffusion and/or dissolution of oxygen and hydrogen. The power and energy produced by the electrochemical cell may increase with increasing temperature.

Multiple electrochemical energy harvesting cells may be connected in series or in parallel to increase the voltage, current, and/or capacitance of the device.

In one embodiment, the positive electrode comprises hydrous $RuO_2$ on platinum foil. These electrodes have naturally occurring potentials of ~1.0 V vs a normal hydrogen electrode (NHE). Hydrous $RuO_2$ strongly binds $O_2$, and chemisorbs $O_2$ to its surface even under low oxygen partial pressures. For the negative electrode and current collector, Pt foil is used because in aqueous solutions it has potentials ranging from 0.3 to 0.8 V, its surface conducts protons, it is a metallic conductor, and it is electroactive for hydrogen oxidation. Upon assembly, the electrodes are pressed against opposite sides of a Celgard separator (according to FIG. 1) and submerged in dilute sulfuric acid. The electrochemical devices have naturally occurring open circuit voltages (OCVs) of 0.2 to 0.6 V. The electrodes can be discharged to zero volts at 4 μA to 400 μA/cm² in times ranging from 4000 to 1 s (depending on the experimental conditions). The discharge reaction for the positive electrode is given in formula 1. The power of the devices can range from 0.3 to 700 μW/cm². Over a period of 1 to 3 hr, the cells can autonomously recharge to their open circuit voltage by the oxygen reduction and hydrogen oxidation reactions in formulas 3 and 4.

Having described the invention, the following examples are given to illustrate specific applications of the invention. These specific examples are not intended to limit the scope of the invention described in this application.

EXAMPLE 1

Figure 3:
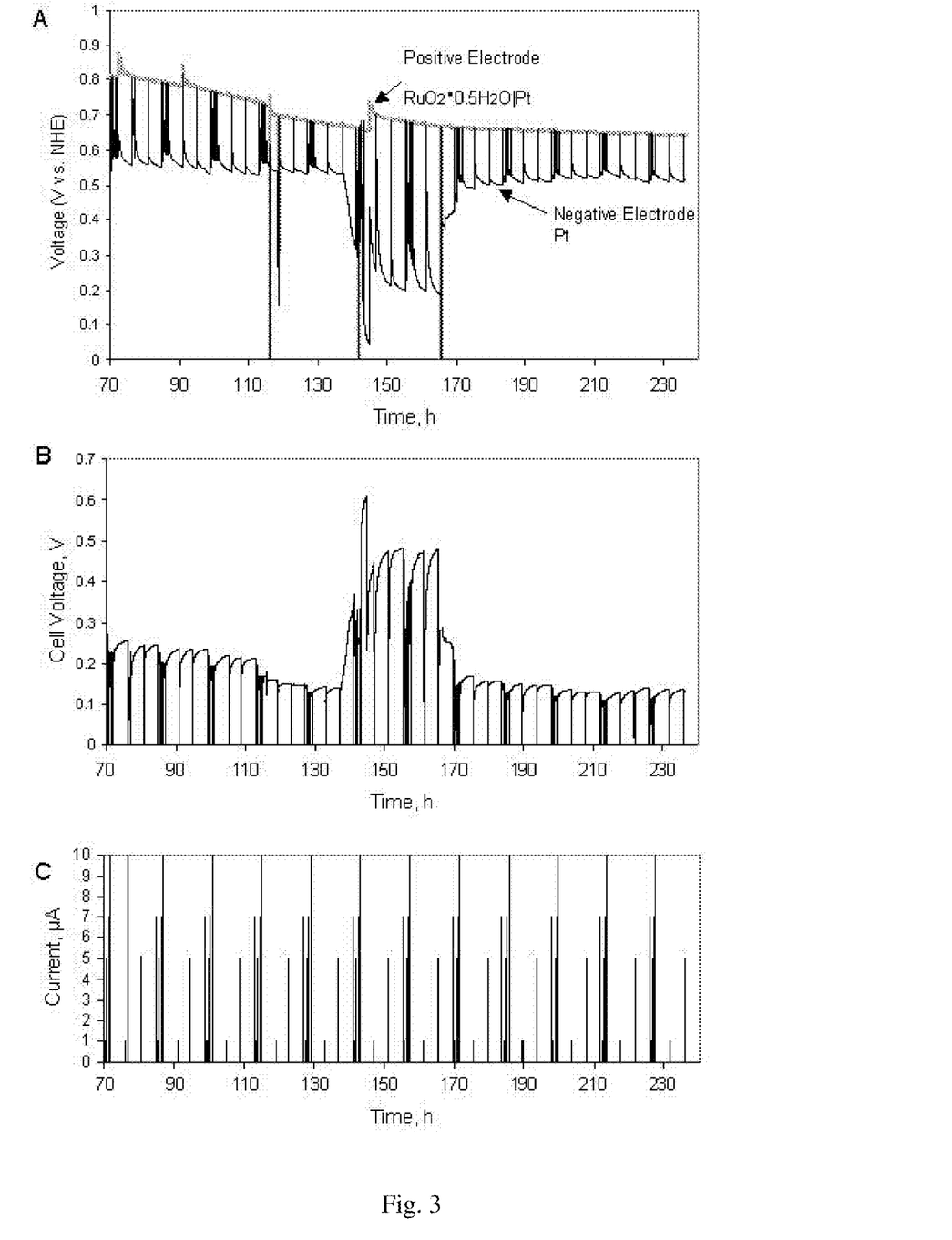
FIG. 3 shows the charging and discharging behavior of a $RuO_2 \cdot 0.5H_2O|_{Pt}$ vs. Pt foil cell using 5 M sulfuric acid under nitrogen.
Figure 4:
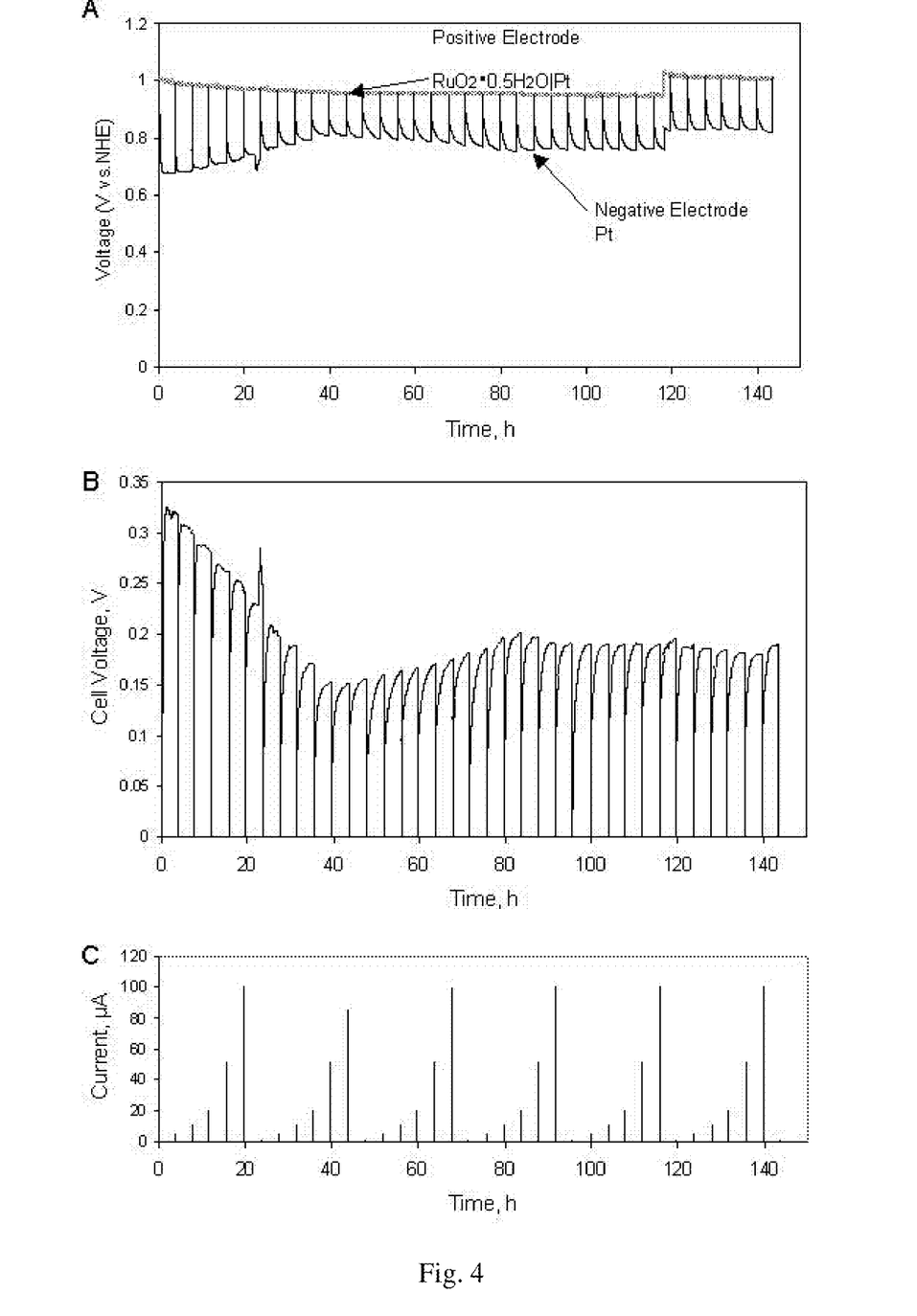
FIG. 4 shows the charging and discharging behavior of a $RuO_2 \cdot 0.5H_2O|_{Pt}$ vs. Pt foil cell using 5 M sulfuric acid in air.
Figure 5:
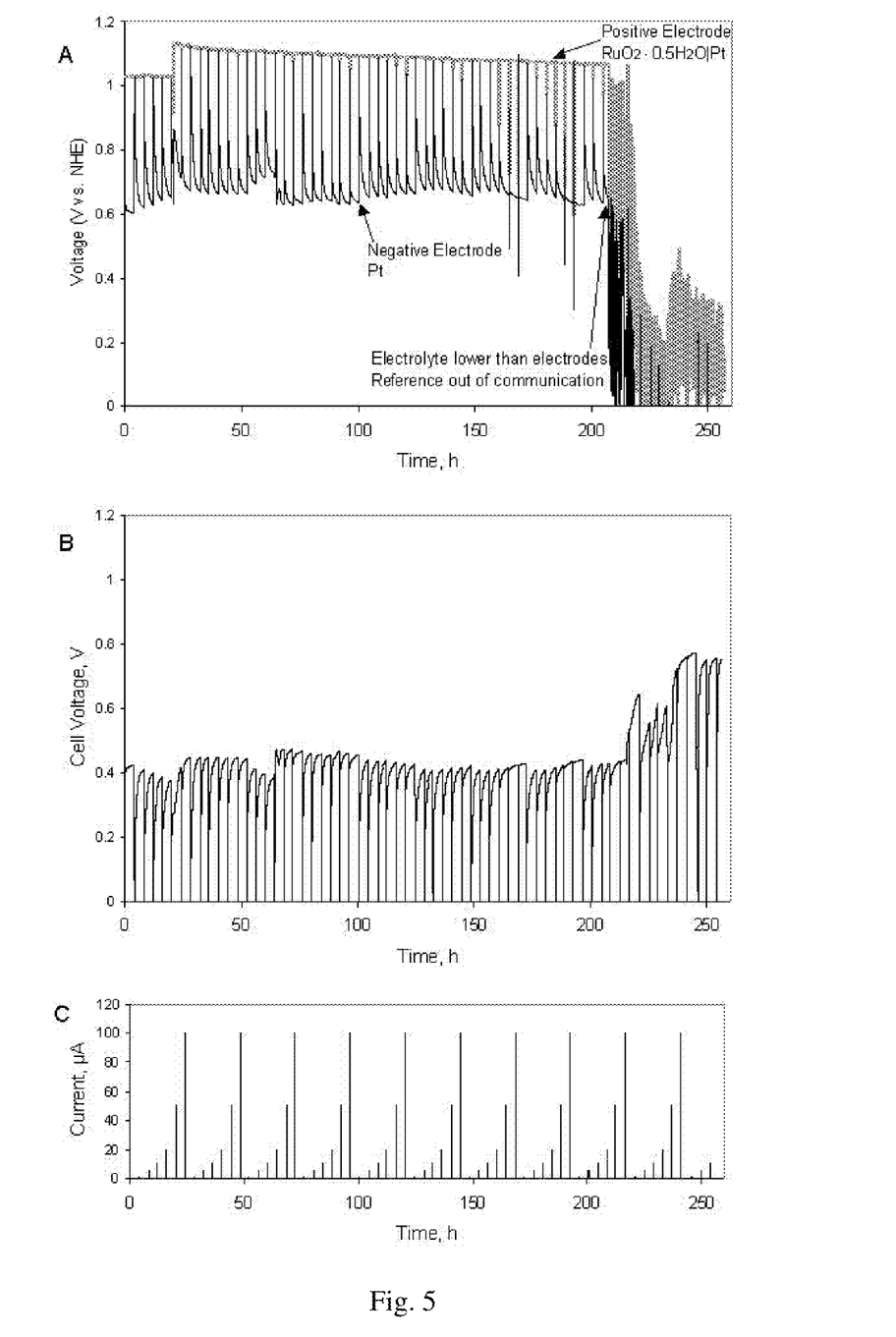
FIG. 5 shows the charging and discharging behavior of a $RuO_2 \cdot 0.5H_2O|_{Pt}$ vs. Pt foil cell using 0.1 M sulfuric acid under nitrogen.

Cell performance vs atmosphere and acidity of electrolyte—For this example, all positive electrodes were $RuO_2.\sim0.5H_2O$ on Pt foil and the negative electrodes were made from Pt foil, but the electrodes were tested under different atmospheres and using different concentrations of sulfuric acid. The results for Example 1 are shown in FIGS. 3, 4, and 5.

The $RuO_2.\sim0.5H_2O$ was prepared by heating as-received $RuO_2.2H_2O$ (Alfa Aesar) at 150° C. for 18 hours in air. Pt foil (0.1 mm thick, Alfa Aesar) was cut into strips and cleaned in reagent-grade aqua regia. Positive electrodes were prepared by adding a drop of a 5% Nafion ionomer solution (Ion Power, Inc.) to the surface of the Pt foil, and then pressing 1 to 3 mg of the ground hydrous $RuO_2$ on the Nafion-coated Pt foil at 1200-2000 psi for 30 s. The positive electrodes were assembled as full cells in stacked structures with a trilayer material of polypropylene-polyethylene-polypropylene (Celgard 2300) serving as the separator and another piece of clean Pt foil serving as the negative electrode and current collector for the negative electrode.

For electrochemical evaluation, cell assemblies were bound together with Teflon tape and then suspended from the top of 2 or 10 mL glass vials filled with a high purity sulfuric acid electrolyte ($H_2SO_4$/Optima, Fisher Scientific and 18 MΩ·cm water). A Pd/H wire was used as a normal hydrogen electrode (NHE) reference to the positive electrode. The Pd/H wire was routinely recharged to ensure that its potential was maintained. Note that the Pd/H was recognized as a potential source of hydrogen gas, and these experiments were also validated without the Pd/H reference. The cells were tested in air or housed in glove bags filled with $N_2$ at ambient temperature (~25° C.). They were discharged through successive cycles at 4 to 400 μA/cm² using a multi-channel battery tester (Maccor, Model 2300), and the following properties were monitored: OCV; potential difference between the positive and reference electrodes; and the capacity, energy, and mean power of each cycle. The cells rested for 30 to 240 min between discharge cycles. The OCV of the cells during the rest period was monitored to get information about the self-charge of the electrodes. The cells were also allowed to rest without leads attached, and the same results were garnered as when the potentiostat was continuously connected to the electrodes. The potential of the negative electrode was determined by the difference of the OCV and the referenced potential of the positive electrode. Data were normalized to the geometric area of the $RuO_2.0.5H_2O$ powder on the positive electrode (~0.25 cm²).

The compositions of the asymmetric cells and their test conditions are summarized in Table I, and Table II shows the discharge time, specific capacity, specific energy, and specific mean power of the cells as a function of the discharge current, with maximum values included in parentheses. Cells were operated for over 800 hours and 200 cycles. Power densities of the discharge pulses were in the range of 0.28 μW/cm² to 0.7 μW/cm²

TABLE I

| Cell No. | Positive Electrode | Negative electrode | Electrolyte/ Atmosphere | $RuO_2$ mass (mg) |
|---|---|---|---|---|
| FIG. 3 | $RuO_2 \cdot 0.5H_2O \vert_{Pt}$ | Pt | 5M $H_2SO_4$ in $N_2$ | 1.92 |
| FIG. 4 | $RuO_2 \cdot 0.5H_2O \vert_{Pt}$ | Pt | 5M $H_2SO_4$ in Air | 1.43 |
| FIG. 5 | $RuO_2 \cdot 0.5H_2O \vert_{Pt}$ | Pt | 0.1M $H_2SO_4$ in $N_2$ | 2.51 |

TABLE II

| Cell No. | Discharge time min:sec.deg | | | Specific Capacity $\mu Ah/cm^2$ | | | Specific Energy $\mu Wh/cm^2$ | | | Specific Mean Power $\mu W/cm^2$ | | |
|---|---|---|---|---|---|---|---|---|---|---|---|---|
| | 1 $\mu A$ | 10 $\mu A$ | 100 $\mu A$ | 1 $\mu A$ | 10 $\mu A$ | 100 $\mu A$ | 1 $\mu A$ | 10 $\mu A$ | 100 $\mu A$ | 1 $\mu A$ | 10 $\mu A$ | 100 $\mu A$ |
| FIG. 3 | 01:07.30 (18:39.73) | 00:01.13 (00:06.48) | — | 0.09 (0.58) | 0.02 (0.07) | — | 0.007 (0.06) | 0.001 (0.008) | — | 0.28 | 2.36 (38.8) | — |
| FIG. 4 | 01:20.00 | 00:06.00 | 00:00.40 | 0.10 | 0.08 | 0.05 | 0.009 | 0.006 | 0.015 | 0.33 | 3.40 | 84.0 |
| FIG. 5 | 04:09.89 (1:12:00.00)[a] | 00:11.18 (01:14.85) | 00:00.47 (00:00.44) | 0.22 (1.2) | 0.11 | 0.07 | 0.048 (0.39) | 0.022 (0.16) | 0.018 (0.02) | 0.68 (1.4) | 6.80 (12.0) | 134.0 (704) |

[a] time denoted in hr:min:sec.deg

The voltage response of the discharge and charging behavior of the cell in FIG. 3 ($RuO_2.0.5H_2O$ on Pt foil vs. Pt foil in 5 M $H_2SO_4$ in $N_2$) is shown between 70 and 240 hr of the experiment. The plots of individual electrode potentials, cell voltage, and discharge currents for this cell are shown in FIGS. 3A-C, respectively. Not shown are the initial discharges that took place in the first 8 hr of the experiment followed by a 62 hr rest period. The potentials of the positive and negative electrodes are shown in FIG. 3A, and the resulting cell voltage is plotted in FIG. 3B. The discharge currents (shown in FIG. 3C) ranged between 1 and 10 $\mu A$ (or 4-40 $\mu A/cm^2$ on the 0.25 $cm^2$ electrode interface area) with rest times of 30 or 240 min between discharge cycles. The positive electrode maintained a potential between 0.8 and 0.68 V, while the negative electrode had a potential of 0.55 V, to yield a cell OCV of 0.25 to 0.13 V. When the cells were discharged, the Pt negative electrode increased in potential much more than the hydrous $RuO_2$ positive electrode decreased, presumably due to differences in their capacities (foil vs. high surface area material). After about 146 hr and 34 cycles, the potential of the Pt negative electrode decreased from 0.55 V to 0.2 V, resulting in a significant increase in the cell voltage, power, capacity, etc. (results listed in parenthesis in Table I). After 24 hr (170 hr of the experiment), the Pt electrode returned to its original potential.

FIG. 4 shows the electrode potentials, cell voltage and discharge currents for a cell that was identical to that in FIG. 3, but was tested in an oxidizing atmosphere and under larger discharge currents (up to 100 $\mu A$ or 400 $\mu A/cm^2$) and rest periods of 240 min. The positive $RuO_2.0.5H_2O$ electrode maintained a voltage of 1.02-0.95 V; the small drift in the potential was primarily due to an increase in the potential of the Pd/H reference electrode under the oxidizing environment. The 0.07 V increase in the potential of the positive electrode at 119 hr in FIG. 4A is due to recharging of the Pd/H electrode. The potential of the Pt negative electrode was 0.7-0.8 V. As shown in FIG. 4B, the full cell voltage consistently returned to ~0.2 V after discharge. The only observable effect of the air environment vs. the $N_2$ atmosphere used in FIG. 3 is that the potentials of the positive and negative electrodes were both higher, presumably due to the oxidation of the electrode materials. The oxidizing atmosphere had negligible effect on the capacity, specific power, and specific energy of this cell (Table I).

The cell in FIG. 5 was also compositionally identical to those in FIG. 3, but it was tested in 0.1 M $H_2SO_4$ to investigate the effect of the electrolyte acidity. It was tested under $N_2$ and at discharge currents from 1 to 100 $\mu A$ (4-400 $\mu A/cm^2$) with a rest time of 240 min between cycles. The plots of individual electrode potentials, cell voltage, and discharge currents of the cell are shown in FIGS. 5A-C, respectively. The decrease in electrolyte acidity caused a decrease in the potential of the negative Pt electrode to ~0.6 V while the hydrous $RuO_2$ positive electrode increased in potential to ~1.1 V. Combining these effects caused the cell voltage to increase approximately 0.2 V with respect to the Cell 1, which was in 5 M $H_2SO_4$. The cell voltage consistently returned to a potential between 0.4 and 0.45 V after being subject to a discharge and allowing for a rest period. The cell voltage increased as the cell was run in air, and the cell voltage doubled to 0.8 V. Compared to the cells in FIGS. 3 and 4, this cell had higher specific capacity, energy, and mean power.

EXAMPLE 2

Figure 6:
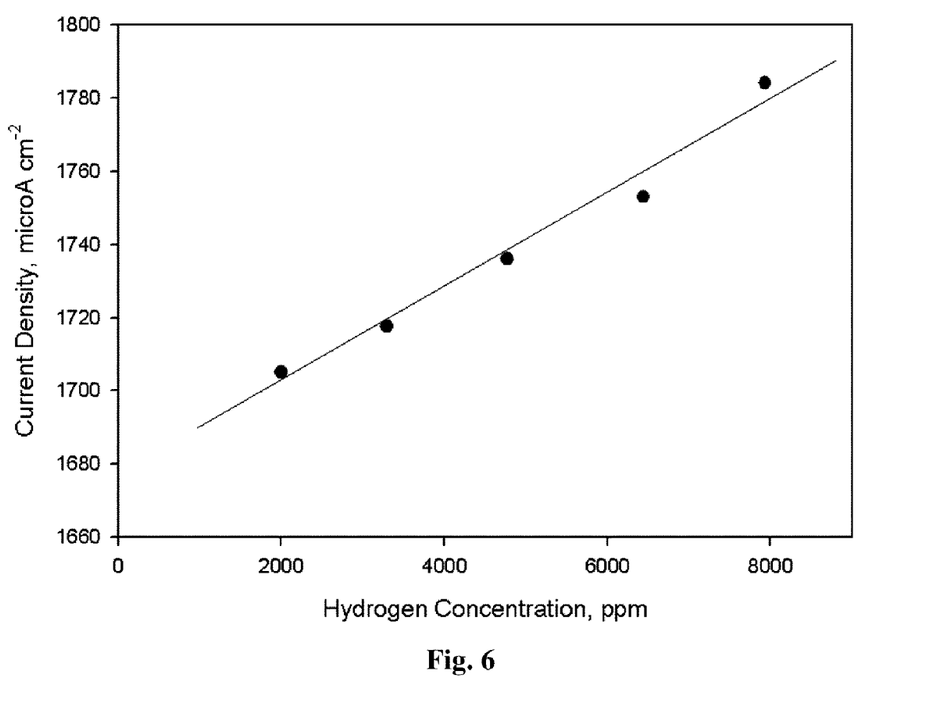
FIG. 6 shows the current density of a $RuO_2 \cdot 0.5H_2O|_{Pt}$ vs. Pt foil cell using 0.1 M sulfuric acid when the cell was under varying hydrogen concentration.

Dependence of cells on hydrogen pressure—The cell in FIG. 5 was compositionally identical to those in FIG. 3, but it was tested in cells were evaluated under a range of low hydrogen pressures to verify that dilute hydrogen is the energy source for the devices. Cells were constructed with positive electrodes of $RuO_2.0.5H_2O$ on Pt and negative electrodes of Pt black on Pt and were submerged in 0.1 M $H_2SO_4$ at 20° C. Laboratory-grade oxygen and nitrogen were mixed in a ratio of 1 to 5 (to mimic atmospheric conditions) and then 2000-8000 ppm of hydrogen gas was added to the flow. The current density was measured when the cell was under a 100 mV load and plotted vs. the hydrogen concentration in FIG. 6. The cell performance was proportional to the fixed hydrogen concentration of the atmosphere. Although there is 0.5 to 1 ppm of $H_2$ naturally found in the atmosphere, this has a negligible effect on the 2000-8000 ppm of added $H_2$. The linear regression of the line to 1 ppm indicates that the cells operating on the ambient atmosphere should operate at 0.005 to 0.01 $\mu A/cm^2$. Because the cells in the Examples 1 and 3-6 have higher current densities, this implies that hydrogen is available from other sources, such as from the splitting of water to $H_2$ and $O_2$ on metal and glass surfaces via thermal energy and/or light.

EXAMPLE 3

Figure 7:
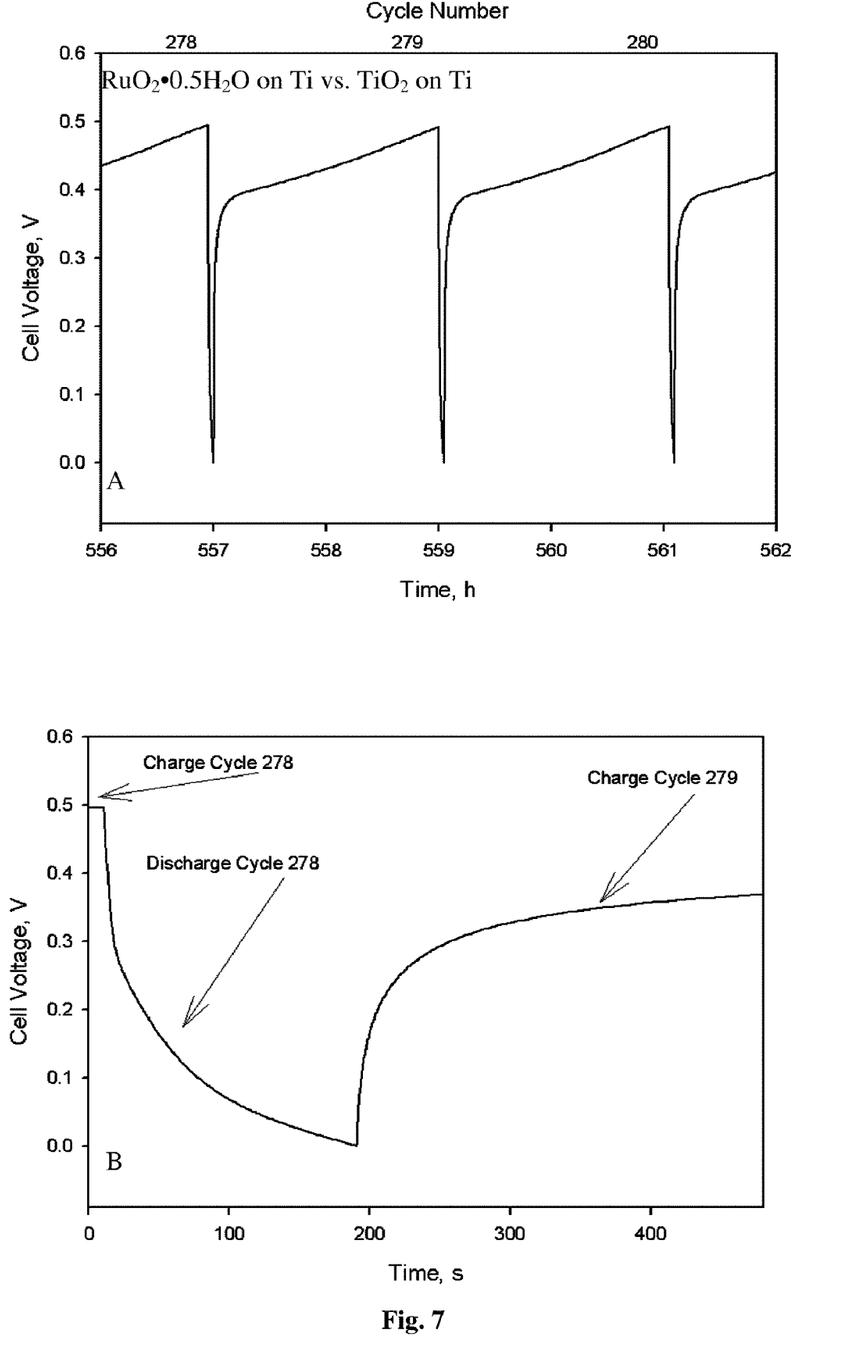
FIG. 7 shows the measured cell voltage as a function of time for a $RuO_2.0.5H_2O|_{Ti}$ vs. $TiO_2|_{Ti}$ cell.

High temperature operation of cell and fuel cell mode—A cell was made using $RuO_2.0.5H_2O$ on Ti as the positive electrode and $TiO_2$ on Ti as the negative electrode in 0.1 M $H_2SO_4$ at 25° C. FIG. 7 shows a portion of the measured cell voltage as a function of time as the cells were discharged at 5 $\mu A$. Cycles 278-280 are shown in FIG. 7A and cycle 278 is expanded in FIG. 7B. The cells took 170 s to discharge and 2 h were allowed for recharging. From this data, the cell capacity was 0.2 $\mu Ah/cm^2$, and the mean power (half of max) was 0.45 $\mu W/cm^2$. The cell was run for a total of 800 h and 356 cycles.

Figure 8:
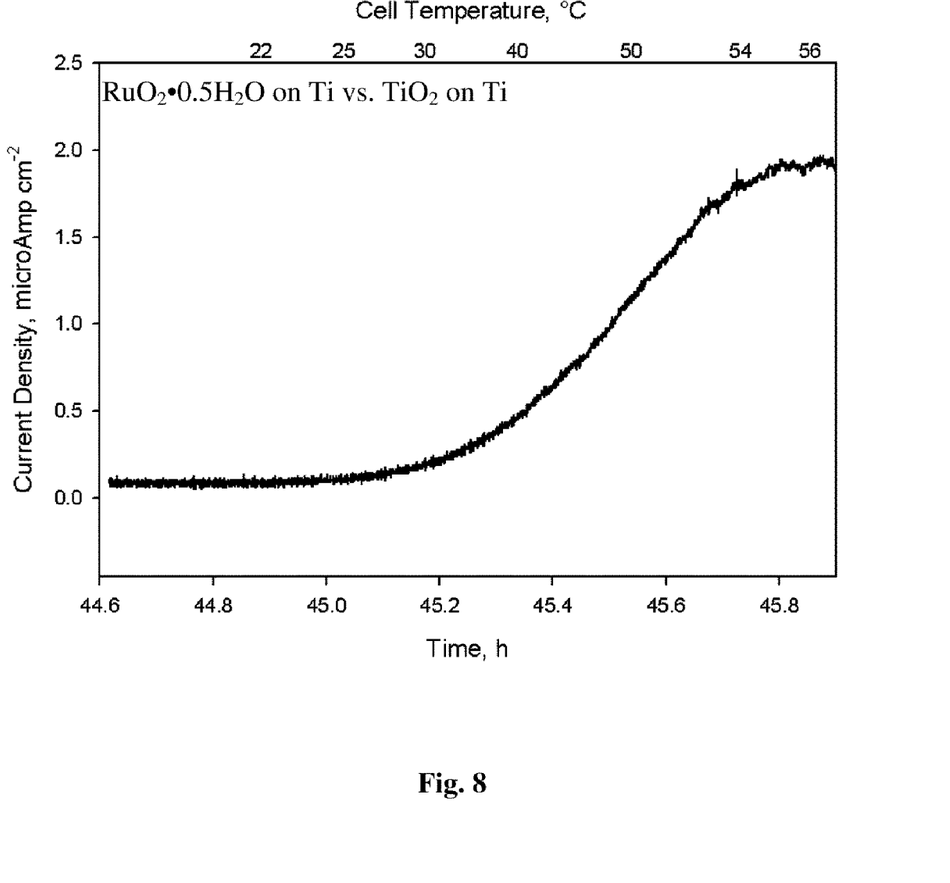
FIG. 8 shows the measured current for a $RuO_2.0.5H_2O|_{Ti}$ vs. $TiO_2|_{Ti}$ cell.

FIG. 8 shows the measured current for the cell in FIG. 7 as it was heated from room temperature to 60° C., as it was operated in steady-state or fuel cell mode (the voltage of the cell remains constant while the current is drained, and the cell is not discharged). The cell current increased from 0.09 $\mu A/cm^2$ at 22° C. to nearly 2.0 $\mu A/cm^2$ at 56° C. The increase in the cell current with increasing temperature can be contributed both better performance of the catalysts at higher temperatures (as is observed with state-of-the-art proton exchange membrane fuel cells) and also to an increase in the amount of dissolved hydrogen near the electrodes.

Figure 9:
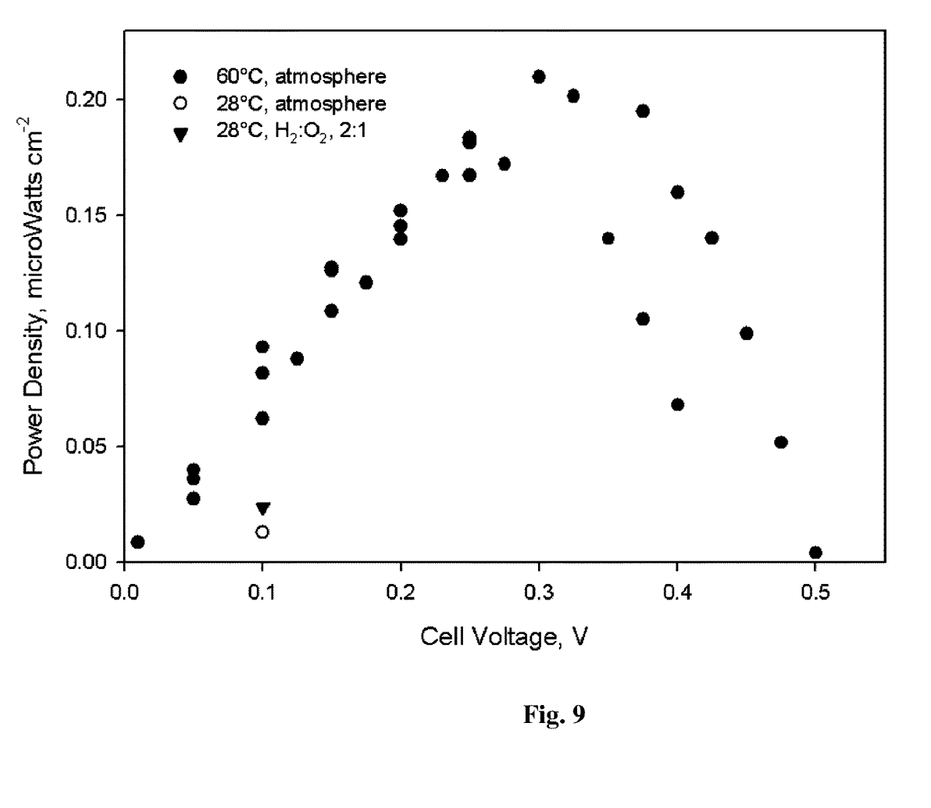
FIG. 9 shows the voltage/power response of a $RuO_2.0.5H_2|_{Ti}$ vs. $TiO_2|_{Ti}$ cell at both 60° C. and 28° C.

FIG. 9 shows a plot of the power vs. voltage of the steady-state or fuel cell performance of the cell ($RuO_2.0.5H_2O$ on Ti vs. $TiO_2$ on Ti). The optimum operating voltage for the cell at 60° C. was determined by varying the load pulled on the system by stepping up the voltage from 0.01 V and by stepping down the voltage from 0.5 V. The cells required approximately 15 min to equilibrate at low voltages and 2 h to equilibrate at the higher voltages. The cell performance was also measured at 28° C. under atmospheric air and under an atmosphere of 2:1 $H_2:O_2$ at (4.28 h). As expected from FIG. 8, the device had higher power at 60° C. vs. 28° C.

EXAMPLE 4

Figure 10:
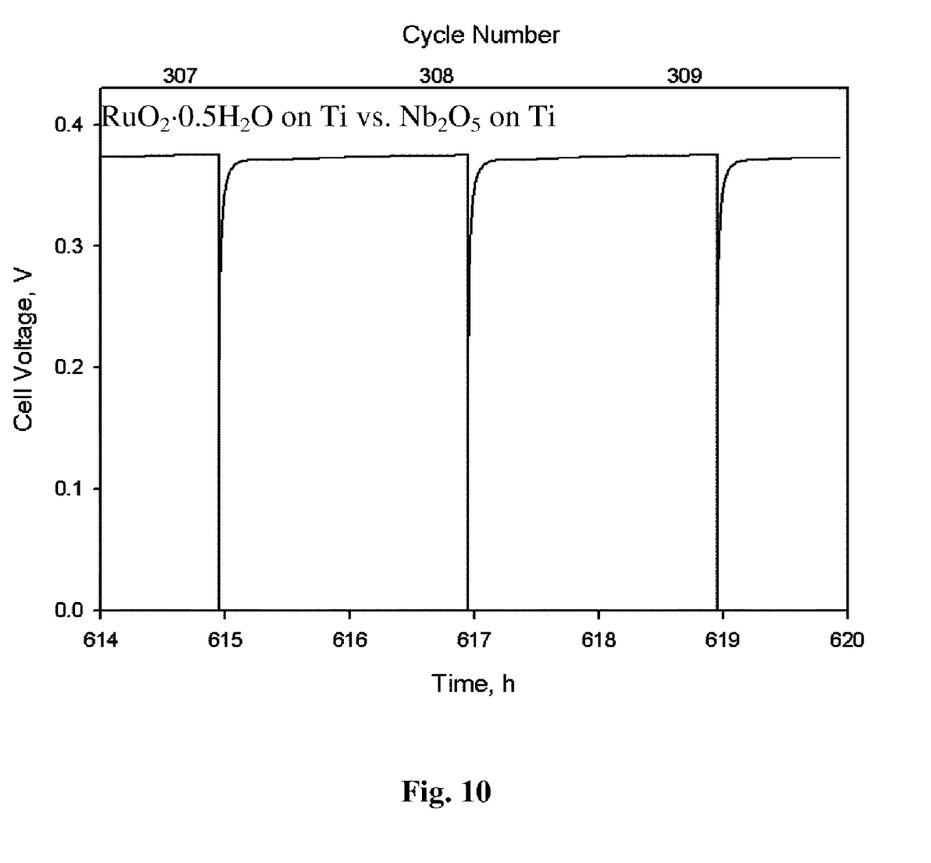
FIG. 10 shows the measured voltage for a $RuO_2.0.5H_2O|_{Ti}$ vs. $Nb_2O_5|_{Ti}$ cell operated at 60° C.

Cell with no Pt in positive and negative electrodes—FIG. 10 shows the performance of a cell was made using hydrous ruthenium oxide on Ti as the positive electrode and $Nb_2O_5$ on Ti as the negative electrode ($RuO_2.0.5H_2O$ on Ti vs. $Nb_2O_5$ on Ti) in 0.1 M $H_2SO_4$ at 25° C. The cell was discharged in 1 s every two hours using a 100 μA drain.

EXAMPLE 5

Figure 11:
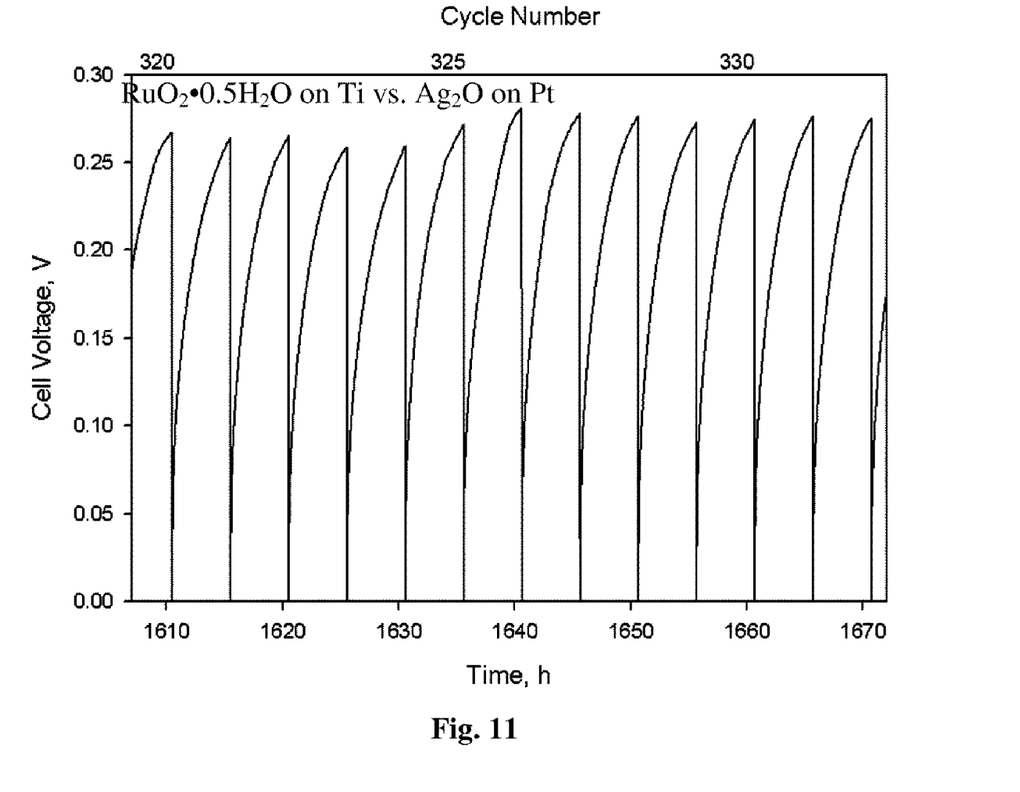
FIG. 11 shows the cell voltage as a function of time of a $RuO_2.0.5H_2O|_{Ti}$ vs. $Ag_2O|_{Ti}$ cell while operated in air.

Operation of a cell in air—The cell shown in FIG. 11 was operated in ambient air, and not submerged in water. The cell was made using hydrous ruthenium oxide on Ti as the positive electrode and $Ag_2O$ on Ti as the negative electrode and wrapped together in Teflon tape as above. The cell was initially soaked in 0.1 M $H_2SO_4$ and then operated in ambient air for 330 cycles and 1600 hr using a 5 μA drain every 5 hrs. Although $AgO_2$ is soluble in acid, some silver likely remained in the anode and contributed to the high capacity of the cell. The cell appeared to be affected by the humidity of the laboratory. The average capacity of each cycle was 0.1 μA. Continuous operation of a cell in ambient air should be feasible because the cells produce water as they recharge (the sum of formulas 3 and 4).

EXAMPLE 6

Figure 12:
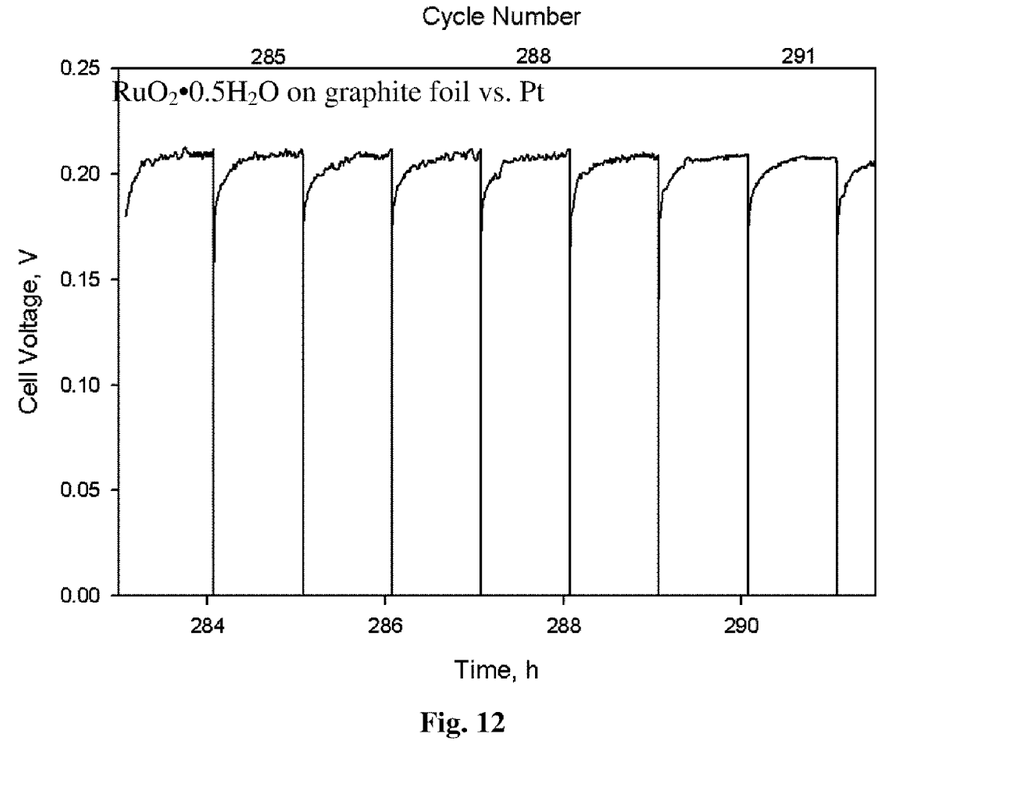
FIG. 12 shows the cell voltage as a function of time of a $RuO_2.0.5H_2O|_{graphite}$ vs. Pt foil cell in tap water.

Operation of a cell in tap water—A cell was made using hydrous ruthenium oxide on graphite foil as the positive electrode and Pt foil as the negative electrode and was submerged in Washington, D.C. tap water. FIG. 12 shows the voltage of the cell as it was discharged and during rest (recharging). The cells were discharged at 5 μA discharge every 1 h for 300 cycles.

Obviously, many modifications and variations of the present invention are possible in light of the above teachings. It is therefore to be understood that the invention may be practiced otherwise than as specifically described.

We claim:

1. A method of harvesting energy comprising the steps of; providing a device comprising:
    a positive electrode comprising a positive electrode material selected from the group consisting of a metal, a metal oxide, a hydrous metal oxide, semiconductor, alloys thereof, and mixtures thereof;
        wherein the positive electrode is capable of storing and donating ions and electrons; and
        wherein the positive electrode is capable of reducing oxygen;
    a negative electrode comprising a negative electrode material selected from the group consisting of a metal, a metal oxide, a hydrous metal oxide, semiconductor, alloys thereof, and mixtures thereof;
        wherein the negative electrode material is different from the positive electrode material;
        wherein the negative electrode is capable of storing and donating ions and electrons;
        wherein the negative electrode is capable of oxidizing hydrogen; and
    an electrolyte that permits transport of oxygen and hydrogen in contact with the positive electrode material and the negative electrode material;
    allowing the device to charge by consumption of ambient hydrogen and oxygen gases; and
    discharging the device.

2. The method of claim 1, wherein the allowing step and the discharging step are repeated one or more times.

3. The method of claim 1, wherein the discharging step is performed such the rate of discharge is approximately equal to the rate of charging.

4. The method of claim 1, wherein the allowing step and the discharging step are performed simultaneously.

5. The method of claim 1, further comprising the step of: transmitting the power generated in the discharging step to one or more electronic devices.

6. The method of claim 1;
    wherein the positive electrode material and the negative electrode material are capable of storing and donating protons; and
    wherein the electrolyte is a proton-conducting electrolyte.

7. The method of claim 1, wherein the positive electrode material and negative electrode material have different thermodynamic potentials.

8. The method of claim 1, wherein the positive electrode material is coated on a conductive metal or carbon.

9. The method of claim 1, wherein the positive electrode material comprises hydrous ruthenium oxide or hydrous iridium oxide.

10. The method of claim 9, wherein the hydrous ruthenium oxide is coated on a material selected from the group consisting of platinum metal, titanium metal, and carbon paper.

11. The method of claim 1, wherein the negative electrode material comprises platinum metal.

12. The method of claim 1, wherein the negative electrode material comprises an element selected from the group consisting of ruthenium, manganese, molybdenum, tungsten, platinum, gold, palladium, silver, titanium, copper, zinc, nickel, aluminum, gallium, germanium, arsenic, selenium, silicon, and phosphorous.

13. The method of claim 1, wherein the positive electrode, the negative electrode, or both are a hydrogen storage alloy.

14. The method of claim 1, wherein the electrolyte is aqueous or comprises sulfuric acid, seawater, tap water, an oxide, or a polymer.

15. The method of claim 1, further comprising a source of oxygen and hydrogen.

16. The method of claim 1, wherein the electrolyte is exposed to ambient air.

17. The method of claim 1, wherein the positive electrode material and the negative electrode material are exposed to ambient air.

18. The method of claim 1, further comprising a substrate capable of converting water to oxygen and hydrogen when exposed to ambient energy.

19. The method of claim 18, wherein the substrate is titanium foil.

20. The method of claim 18, wherein the substrate is the positive electrode, the negative electrode, or both.

\* \* \* \* \*